United States Patent
Hurley

(10) Patent No.: US 7,208,457 B2
(45) Date of Patent: Apr. 24, 2007

(54) HEAVY METAL-REMEDIATING PAINT STRIPPER

(75) Inventor: Peter J. Hurley, West Yorkshire (GB)

(73) Assignee: Solucorp Industries, Ltd., West Nyack, NY (US)

( * ) Notice: Subject to any disclaimer, the term of this patent is extended or adjusted under 35 U.S.C. 154(b) by 0 days.

(21) Appl. No.: 11/013,770

(22) Filed: Dec. 16, 2004

(65) Prior Publication Data

US 2005/0130858 A1   Jun. 16, 2005

Related U.S. Application Data

(60) Provisional application No. 60/529,870, filed on Dec. 16, 2003.

(51) Int. Cl.
    *C11D 17/00*   (2006.01)
(52) U.S. Cl. .............. 510/201; 510/202; 510/207; 510/209; 510/212; 510/463; 510/493; 510/509; 510/510
(58) Field of Classification Search .............. None
    See application file for complete search history.

(56) References Cited

U.S. PATENT DOCUMENTS

| | | | | |
|---|---|---|---|---|
| 5,637,355 A | * | 6/1997 | Stanforth et al. | 427/344 |
| 5,667,696 A | * | 9/1997 | Studer et al. | 210/702 |
| 5,827,574 A | * | 10/1998 | Stanforth et al. | 427/341 |
| 5,851,278 A | * | 12/1998 | Stanforth et al. | 106/287.25 |
| 6,358,901 B1 | * | 3/2002 | Joye et al. | 510/201 |
| 6,465,405 B1 | | 10/2002 | Vitomir | |
| 2003/0069155 A1 | * | 4/2003 | Mangin et al. | 510/297 |
| 2003/0119686 A1 | * | 6/2003 | Machac et al. | 510/201 |
| 2004/0031717 A1 | * | 2/2004 | Edwards et al. | 206/524.7 |

\* cited by examiner

*Primary Examiner*—Necholus Ogden
(74) *Attorney, Agent, or Firm*—Christie, Parker & Hale, LLP.

(57) ABSTRACT

An improved paint stripper is provided and comprises at least one paint-stripping agent modified with at least one heavy metal remediation agent. Optionally, one or more viscosity-modification agents, dispersants, or other additive is also included. The invention also provides a kit for making a heavy metal-remediating paint stripper, comprising a vessel containing a paint-stripping agent and a dissolvable packet containing a remediation agent. To use the kit, a painter or other laborer opens the vessel containing the paint-stripping agent and deposits therein the packet containing the remediation agent. The packet dissolves, thereby releasing the remediation agent into the stripping agent.

4 Claims, 1 Drawing Sheet

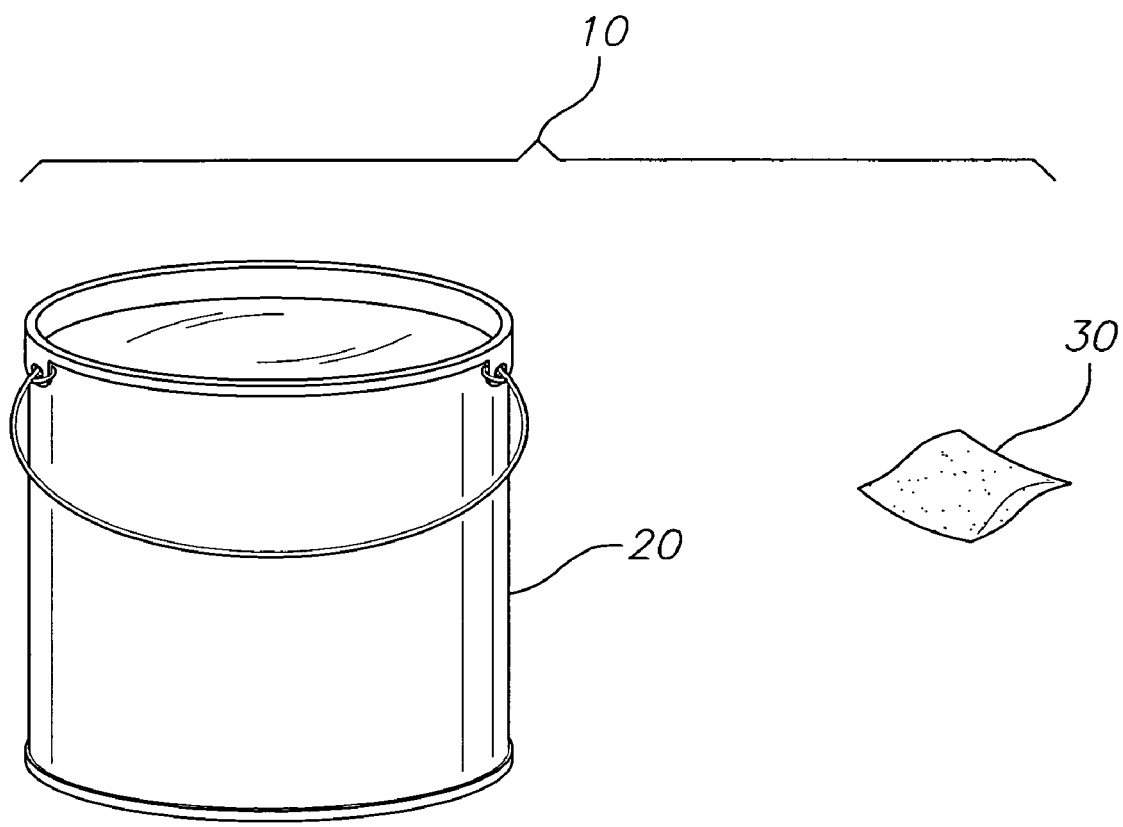

HEAVY METAL-REMEDIATING PAINT STRIPPER

CROSS-REFERENCE TO RELATED APPLICATION(S)

This application is based on and claims priority of U.S. Provisional Application No. 60/529,870, filed, Dec. 16, 2003, the entire contents of which are incorporated by reference herein.

BACKGROUND OF THE INVENTION

It is known that lead and many of its compounds are toxic. Prior to the 1970's, lead and other heavy metal-based pigments, such as cadmium-, chromium-, and arsenic-based pigments, were extensively used for the manufacture of paints. These paints constitute a major health hazard, and the removal of old paintwork and disposal of the paint residues is problematic and regulated. The removal of lead-based paint (LBP) by sanding or flame gun is prohibited is some jurisdictions. Sand blasting is permitted with appropriate health and safety measures and containment precautions in exterior environments.

Lead-based paints have been removed and treated utilizing calcium silicate-containing sand blasting grit presently sold under the trade name Blastox. Similar metal-sorbing abrasives used for sand blasting and containing phosphates are sold under the trademark Leadx. When subsequently wetted, the residues from LBPs stripped with the alkali calcium silicate-containing abrasives form a stabilized complex of lead carbonate and lead silicate in a calcium-rich cement-like matrix. Though no untreated control study was undertaken, calcium silicate LBP residues were shown to reduce leachability of lead by TCLP to less than 5 mg/litre, achieving "non-hazardous" classification for landfills, apparently through dilution with the abrasive, the action of its intrinsically high alkalinity (greater than pH 10), and it cementatious nature. However, the nature of the calcium silicate matrix is such that it is potentially susceptible to pH reduction and destabilization through the action of atmospheric carbon dioxide. Thus, the residue, whilst considered non-hazardous by virtue of its low leachable lead, is not necessarily entirely non-hazardous, by virtue of its high alkalinity. Furthermore, the residue is not non-toxic by ingestion or inhalation. Residues from calcium silicate sand blasting are fine. To avoid their becoming wind-blown, they must be contained using conventional blanketing techniques or by spraying as slurry. Also, operatives must be protected from breathing or ingesting fine dusts and aerosols.

Paint strippers are not designed "to fix" lead and other metal pigments found in paints, but simply facilitate removal of the paint from a surface. The resulting residue (paint-strippings) contains toxic metals in a potentially leachable form, and must be disposed of in accordance with applicable government regulations, often at substantial expense.

Modern paint strippers are typically blended formulations based on one or more stripping agents, such as an organic solvent. Methylene chloride-based strippers are particularly widely used. Other ingredients commonly found in paint strippers include cosolvents, activators and corrosion inhibitors, evaporation retarders, thickeners, emulsifiers, wetting agents, and detergents. Chemically, the ingredients found in paint strippers include chlorinated and unchlorinated hydrocarbons, other organic solvents, organic oils, water, alcohols, amines, esters, lactones, pyrrolidones, phenols, organic acids, sulphonic acids, peracids, and peroxides. The components are maintained in a homogeneous suspension with or without the addition of an emulsification agent. Other agents may be added, e.g. humectants, antifoams, hardness regulators and couplers to regulate the polarity of acidic components.

When applied to a dried, painted surface, the paint stripper causes swelling of the surface coating (paint) polymer, and/or breaks the chemical bonds of the coating polymer so that it can be easily mechanically removed by a scraper, brush, or similar device. Some paint strippers contain viscosity-modifying agents such as viscous oils, colloidal silica, hydroxyethyl, hydroxymethyl, or hydroxypropyl cellulose ethers, polyethylene waxes, and polyvinyl alcohol, so that when the stripper is applied to a vertical or other surface it remains in contact with the paint for sufficient time to effect swelling and facilitate paint removal.

Numerous patents have issued for paint strippers. Although some patents address the need for more "environmentally friendly" strippers, by using non-chlorinated solvents or by lowering the number of volatile organic compounds (VOCs), they typically ignore the greater environmental threat posed by lead and other heavy metal pigments contained in the paint itself. U.S. Pat. No. 6,465,405 (Vitomir) discloses the use of peroxide-containing paint stripper compositions having an ambient pH of 2 to 3. These strippers may contain a chelating agent such as phosphonic acids, citric acid, EDTA, etc., at about 0.5 to 4% by weight of the formulation. However, such chelating agents are not heavy metal remediation agents capable of reducing the water solubility of heavy metals at the pH's prevailing in these formulations. Rather, the chelating agents function as hardness regulators, i.e., stabilizers against the use of hard water. Calcium in hard water can interact with the organic acids in the composition, leading to de-stabilization of the emulsified stripper.

Although EDTA has been used for some soil remediation processes and for treatment of lead poisoning, it is not used to reduce the solubility of soluble lead, nor is it used to reduce the toxicity of lead compounds. EDTA is applied to lead systems to form a soluble lead chelate complex. In the case of lead poisoning, the administration of EDTA solubilize the lead in the body to allow it to be excreted from the body in urine and bile. In the case of soil remediation , EDTA is used to solubilize lead such that it may be washed from contaminated soil.

Given the amount of lead-based and similar metal-pigmented paint in place in buildings and other surfaces around the world, and in view of the deficiencies of existing paint strippers, there is a substantial need for an improved paint stripper capable of remediating lead and other heavy metals found in paints.

SUMMARY OF THE INVENTION

According to one aspect of the invention, an improved paint stripper is provided and comprises at least one paint-stripping agent modified with at least one remediation agent (sometimes referred to as an environmental remediation agent, or a heavy metal remediation agent). Optionally, one or more viscosity-modification agents, dispersants, or other additive is also included. The stripping agent is preferably an environmentally friendly compound or mixture of compounds having low toxicity, low (or zero) VOCs, and neutral pH. Alternatively, the paint-stripping agent comprises one or more conventional stripping agents, such as methylene chloride or other organic solvent(s). The remediation agent comprises one or more substances, typically inorganic, capable of "fixing" lead and/or other heavy metal ions. That is, the remediation agent is capable of reducing or preventing the water-solubility of lead and/or other metal pigments commonly used in paints. The remediation agent can function as part of an integrated fixation system (IFS), described in greater detail in allowed U.S. patent application Ser. No. 09/646,544 (Webster and Hurley), the entire contents of which are incorporated by reference herein.

In another aspect of the invention, a kit for making a heavy metal-remediating paint stripper is provided and comprises a vessel containing a paint-stripping agent and a dissolvable packet containing a remediation agent. To use the kit, a painter or other laborer opens the vessel containing the paint-stripping agent and deposits therein the packet containing the remediation agent. The packet dissolves, thereby releasing the remediation agent into the stripping agent. If necessary, the combined materials are stirred, in some embodiments forming a homogeneous paste. The resulting composition can then be applied to a painted surface to effect paint-stripping and metal remediation.

The combination of a heavy metal remediation agent, paint-stripping agent, and polymeric viscosity-modification agent provides an integrated fixation system which, when applied to a surface coated with a lead-based or other metal-pigmented paint, will enable the removal of the paint in a non-dusting form, with simultaneous remediation of the lead or other heavy metals-based pigments contained therein by rendering the metals insoluble. This treatment will render non-hazardous the residues from paint-stripping, enabling their disposal in landfills, at a concomitantly lower cost. Stripped paint residues comprising a combination of potentially soluble heavy metal material and a remediation reagent contained within a polymer matrix (i.e., the removed paint and the viscosity-modification agent) are inherently more environmentally benign than metal-containing paint residues removed by non-remediating methods. Subject to local regulatory approval, the stripped residues may be disposed of as non-hazardous waste.

BRIEF DESCRIPTION OF THE DRAWINGS

These and other features and embodiments of the invention will become better understood when reference is made to the following detailed description and accompanying FIGURE, which is a schematic illustration of a kit for a self-remediating paint stripper according to one embodiment of the invention.

DETAILED DESCRIPTION OF THE INVENTION

According to a first aspect of the invention, a heavy metal-remediating paint stripper comprises one or more paint-stripping agents combined with a remediation agent. Preferred paint-stripping agents are environmentally friendly, have a neutral pH and low VOC content (or better still, are VOC-free), and are non-toxic. Nonlimiting examples include Soy.Gel™ brand paint stripper, a mixture of N-methyl pyrrolidone (37.5%) and soybean oil, from Franmar Chemicals Inc. (USA; www.soygel.com) and Home Strip-brand paint stripper, from Eco Solutions Limited (UK). Alternatively, the paint-stripping agent comprises a conventional stripping agent, such as methylene chloride or other organic solvent.

A remediation agent or, more preferably, a mixture of remediation agents, is mixed with or dispersed in the paint-stripping agent to form a heavy-metal-remediating paint stripper. Nonlimiting examples of remediation agents include calcium sulfide, calcium phosphate, calcium hydroxide, calcium carbonate, calcium oxide, magnesium sulfide, magnesium phosphate, magnesium hydroxide, magnesium carbonate, magnesium oxide, mixed calcium- and magnesium-containing carbonates and phosphates, apatite, di-calcium hydrogen phosphate, calcium di-hydrogen phosphate, triple super phosphate, dolomite, phosphoric acid and its salts, calcium-X-phosphates (where X is a metal ion), alkaline earth silicates, hydrated silica, hydrated alumina, and metal sorbing clays, such as Bentonite and Fuller's Earth. "Triple super phosphate" (TSP) is $Ca(H_2PO_4)_2 \cdot H_2O$ (CAS No. 65996-95-4). The mineral apatite, $Ca_5(PO_4)_3(F, Cl, OH)$, is functional, but slow. Alkaline earth silicates (e.g., calcium silicate), operate through sorption and as a consequence of their high alkalinity; hence, their effect is likely not permanent. When used by themselves, phosphates are considered suitable for remediation of lead, but they do not remediate other metals. Indeed, application of phosphates to arsenic can actually aggravate leaching.

A preferred remediation agent is MBS™ 2.1, a Molecular Bonding System™-brand remediation agent, from Solucorp, Industries (West Nyack, N.Y.). MBS™ 2.1 is a 3:2:1 (wt/wt) mixture of calcium carbonate/calcium sulfide/triple super phosphate. This reagent is capable of rendering insoluble harmful metals arising from paint residues to concentrations below their U.S.-Universal Treatments Standard (UTS) limits. Typically it can be used in MBS-to-stripper ratios of 1:20 to 3:10, with a ratio of 1:10 being preferred so as to achieve maximum remediation capacity whilst maintaining the fluidity of the stripper on application to painted surfaces.

MBS™ 2.1 is not pH-dependent, and can remediate lead under conditions ranging from pH 1 to pH 13. In contrast, phosphates and silicates are pH-dependent, with phosphates functional under broadly neutral conditions (pH 6 to 8), and silicates functional under strongly alkaline conditions (>pH 10). Additionally, the MBS™ remediation agent converts soluble lead salts to lead sulfide, which is non-toxic by oral administration. Thus, its use should detoxify stripped, lead-based paint residues, permitting less rigorous industrial hygiene and health and safety measures than would otherwise be needed for sand blasting procedures. However, the efficacy of MBS may be reduced if used in conjunction with peroxy acids or peroxides (e.g., peracetic acid or hydrogen peroxide solution). Thus, if highly aggressive strippers containing such components are used (for example, to remove highly crosslinked finishes, such as epoxy resin-based paints), they may be applied as a pretreatment 24 hours prior to application of a heavy metal remediation agent, without any loss of efficacy of the latter.

The choice of paint-stripping and remediation agents can, therefore, be mutually interdependent. For example, if the remediation agent contains a sulfide, paint-stripping agents containing strong acids should be avoided, as there is a risk that hydrogen sulfide could be liberated. Similarly, the combination of highly oxidizing or alkaline remediation agents with chlorinated stripping agents such as methylene chloride or chloroform could result in the release of traces of phosgene. In general, the paint-stripping and remediation agents should be selected in concert, taking care to avoid adverse interactions.

In some embodiments of the invention, it is advantageous to include a viscosity-modification agent to improve the surface properties of the improved paint stripper, that is, to increase the contact time with the painted surface). Nonlimiting examples include anionic polyacrylamides, e.g., Superfloc™ A120, A130, and A150, from Cytech Industries (Rotterdam, The Netherlands); starch- or sugar-based viscosity-modification agents, e.g., Rhodapol™ 23, xanthan gum, from Rhodia Chemicals (Cranbury, N.J.); and hydrated silicon dioxide. Other examples of viscosity-modification gents include hydroxyethyl cellulose, hydroxymethyl cellulose, hydroxypropyl cellulose, polyethylene wax, polyvinyl alcohol, and copolymers of such materials. Combinations of agents can be used. Typical concentrations of viscosity modification agent may vary between 100 mg/litre (for anionic polyacrylamides) and up to 10 g/Litre (for hydroxycelluose based materials) depending upon the nature of the agent. Sufficient quantities should be employed to ensure that the IFS stripper can maintain good contact with a vertical surface during the period of the stripping operation.

Similarly, it can be beneficial to include a dispersant or other emulsifier to improve distribution and/or suspension of the remediation agent(s) throughout the paint stripper. Nonlimiting examples include anionic and non-ionic hyperdispersants, e.g. Sosperse 12000, 22000, 43000, and 44000, from Lubrizol Corp. (Charlotte, N.C.); fatty alcohol alkoxylates, e.g., Brij®, from Uniqema BV (Gouda, The Netherlands); sorbitan esters, e.g., Span® from Uniqema BV; and ester alkoxylates, e.g., Tween®, also from Uniqema BV. Typical concentrations of dispersant or emulsifier may vary between 100 mg/Litre and 10 g/Litre depending upon the nature of the dispersant or emulsifier. Sufficient quantities should be employed to facilitate the rapid and even dispersion of the remediation agent, yet maintain the same in a stable emulsion for sufficient time that it does not settle out from the formulation during the period of the stripping operation.

The paint stripper can also contain one or more additional ingredients found in conventional paint strippers. Nonlimiting examples of such ingredients include cosolvents, activators or corrosion inhibitors, evaporation retarders, thickeners, emulsifiers, wetting agents, and detergents. A heavy metal-remediating paint stripper can be prepared from scratch or by adding one or more remediation agents (and any desired additional ingredients) to an existing paint stripper that contains at least one paint-stripping agent and, optionally, one or more additional ingredients.

A paint stripper according to the invention can be easily and cheaply made, and can be used in exactly the same manner as a conventional stripper by laborers wearing minimal protective clothing, such as masks and gloves, unless additional precautions are warranted by the paint, the paint stripper formulation, and/or the working conditions.

In another aspect of the invention, a remediation agent is pre-packaged and sealed within a dissolvable or decomposable polymeric bag or packet, which can be added to a pre-made paint stripper prior to use. When the packet is deposited in the paint stripper, the packet dissolves or otherwise decomposes, releasing the remediation agent (or agents) into the paint stripper. The resulting combination can be further stirred, if necessary. In some embodiments, the result is a homogenous paste that can be spread on or otherwise applied to a painted surface to be stripped. (Depending on the composition of the polymer bag or packet, its dissolution into the paint stripper could yield a polymer capable of functioning as a polymer matrix akin to the integrated fixation system matrix described in the '544 application.)

Nonlimiting examples of suitable polymer packets include those made of polyvinyl alcohol (PVA), polyvinyl acetate, and copolymers thereof, and similar materials. A specific example is the "Cold Water Soluble PVA Bag" sold by Aquafilm Ltd (Hartlebury, Kidderminster, UK), available in customer-specified dimensions and film thicknesses. As rough indication of scale, a PVA bag filled with remediation agent (100 gram net weight) can be deposited in a 1 liter container of paint stripper. Other bag dimensions, reagent and stripper amounts and concentrations may be appropriate depending on the choice and properties of the paint-stripping agent(s), heavy-metal remediation agent(s), and other ingredients, if any, present in the paint stripper; the metal pigment (s) contained within the paint that is to be stripped; the expected application temperature; and similar considerations.

A packaged remediation agent can be supplied separately from, or in combination with, a selected paint stripper. Hence, the invention also provides a kit for a heavy metal-remediating paint stripper. One embodiment of such a kit is shown in the FIGURE. The kit 10 includes a container of paint stripper 20 and a dissolvable or decomposable polymeric packet 30 containing at least one remediation agent. Optionally, the kit further includes, or is sold with, one or more brushes, rollers, or other devices for applying the enhanced paint stripper to a painted surface, and/or a mask, gloves, or other equipment. To use the kit, a painter or other labor reads any instructions enclosed with the stripper, remediation agent, and/or the kit (including Material Data Safety Sheets, if any); dons appropriate protective apparel (e.g., mask and gloves; ventilator and/or goggles, if required); opens the paint stripper container 20, and deposits the packet 30 of remediation agent therein. The combination is stirred until a homogenous consistency is obtained. The resulting heavy metal-remediating paint stripper is then liberally applied to a painted surface (e.g., 1 liter per 4 to 6 square meters) using a brush or other device. After allowing the stripper to dwell on the surface for a suitable period (e.g., 1 hour), the paint is removed using a scraper, stiff brush, or other suitable implement. Surfaces bearing multiple coats of paint may require additional treatments and/or longer dwell times. In hot climates or other environments where elevated temperatures are encountered, the surface can be covered with a plastic sheet during the dwell period, to prevent the stripper from drying prematurely. The stripped residue can be disposed of in accordance with local or other appropriate regulations.

The following is a nonlimiting example of one embodiment of the invention.

EXAMPLE

Untreated, flaking lead-based paint residues were mechanically removed from the metal structure of a derelict boat lift. These were tested by TCLP and found to leach in excess of 400 mg/litre lead. A heavy metal-remediating paint stripper was prepared by adding a PVA sealed packet containing 114 g of MBS™ 2.1 remediation agent (Solucorp Industries) to 1.15 litre (1 quart) of Soy.Gel™ paint stripper (Franmar Chemicals Inc.) The bag dissolved and the mixture was stirred to a homogeneous consistency. The resulting improved stripper was applied at a rate of 1.15 liter per 2 square meters test area of the boat lift paint work. The stripped residues were collected and submitted for TCLP testing, and leachable lead levels were found to be non-detectable, i.e., less than 0.010 mg/litre, well below the US-UTS limit of 0.750 mg/litre.

The invention has been described with reference to various embodiments and aspects, but is not limited thereto, as other modifications will likely present themselves to the skilled person upon reading this disclosure. Such modifications and equivalents are also considered to lie within the scope of the invention, which is limited only by the following claims.

What is claimed is:

1. A heavy metal-remediating paint stripper, comprising: calcium carbonate, calcium sulfide, and triple super phosphate, mixed with or dispersed in a paint-stripping agent comprising soybean oil and N-methyl pyrrolidone.

2. A heavy metal-remediating paint stripper, comprising: calcium carbonate, calcium sulfide, and triple super phosphate, mixed with or dispersed in a paint-stripping agent comprising methylene chloride.

3. A heavy metal-remediating paint stripper as recited in claim 2, wherein the calcium carbonate, calcium sulfide, and triple super phosphate are present in a 3:2:1 wt/wt ratio.

4. A heavy metal-remediating paint stripper as recited in claim 1, wherein the calcium carbonate, calcium sulfide, and triple super phosphate are present in a 3:2:1 wt/wt ratio.

* * * * *